(12) United States Patent
Yang

(10) Patent No.: US 7,974,013 B2
(45) Date of Patent: Jul. 5, 2011

(54) OPTICAL LENS COMPONENT

(75) Inventor: Zhi Yang, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 33 days.

(21) Appl. No.: 12/496,602

(22) Filed: Jul. 1, 2009

(65) Prior Publication Data

US 2010/0079875 A1    Apr. 1, 2010

(30) Foreign Application Priority Data

Sep. 27, 2008   (CN) .......................... 2008 1 0216652

(51) Int. Cl.
*G02B 13/18* (2006.01)
(52) U.S. Cl. ...................................... 359/716
(58) Field of Classification Search ........... 359/713–716
See application file for complete search history.

(56) References Cited

U.S. PATENT DOCUMENTS

| 7,480,106 B2 * | 1/2009 | Sato et al. ..................... 359/785 |
| 7,564,635 B1 * | 7/2009 | Tang .............................. 359/792 |
| 2008/0212205 A1 * | 9/2008 | Noda ............................. 359/716 |

* cited by examiner

*Primary Examiner* — Scott J Sugarman
(74) *Attorney, Agent, or Firm* — Morgan, Lewis & Bockius LLP

(57) ABSTRACT

An optical lens component comprises a fixed diaphragm, a lens group and a filter. The lens group comprises a first, a second and a third lens which is coaxial and arranged successively from object to image. The fixed diaphragm is located on the front of the first lens and the filter is located on the back of the third lens. The first lens comprises a first surface and a second surface; the second lens comprises a third surface and a fourth surface; and the third lens comprises a fifth surface and a sixth surface. The above six surfaces are all aspheric surfaces.

16 Claims, 10 Drawing Sheets

OPTICAL LENS COMPONENT

CROSS-REFERENCE TO RELATED APPLICATION

This application claims priority to and benefit of Chinese Patent Application Serial No. 200810216652.3, filed in the State Intellectual Property Office of the P. R. China on Sep. 27, 2008, the entire contents of which are incorporated herein by reference.

BACKGROUND OF THE INVENTION

1. Field of the Invention

The present invention relates to an optical device, specifically, relates to an optical lens component.

2. Background of the Related Art

In a digital imaging device, optical imaging lens is a very important component, and the imaging quality of the lens determines the imaging performance of the digital imaging device directly. Digital products upgrade constantly and the digital products tend to be lighter and smaller, so the requirements of the optical lens configured inside the digital imaging device are increasing. Specifically, in a lens module with more than million-pixels, to guarantee good imaging quality and brightness and to achieve adequate field of view, a digital imaging system needs bigger space to inflect light. Usually, the digital imaging system employs the methods of adding the lens numbers, using high quality materials with high refractive index and low dispersion, or using the surface shape of aspheric surface to correct aberrations and improve imaging qualities. The digital products made from the above mentioned methods are difficult to be made as light and small as required. Furthermore, the surface shape of each lens is complicated, which not only increases the lens volume, but also causes difficulty to process forming, and thus results in high production cost.

SUMMARY OF THE INVENTION

The present invention provides an optical lens component, comprising a fixed diaphragm, a lens group and a filter. Said lens group having an optical axis includes a first lens, a second lens and a third lens which are coaxial along the optical axis and arranged successively along the optical axis from an object to an image. Said fixed diaphragm is located in the front of the first lens and the distance between the edges of the fixed diaphragm and the first lens is greater than or equal to zero. Said filter is located behind the third lens such that its front surface of the filter faces the object and its back surface faces the image. The first lens has a first surface facing the object and a second surface facing the image; the second lens has a third surface facing the object and a fourth surface facing the image; the third lens has a fifth surface facing the object and a sixth surface facing the image. The above six surfaces of the lens group are all aspheric surfaces, and said first surface of the first lens is an arc convex facing the object, the second surface of the first lens is a smooth doliform depression facing the image; said third surface of the second lens is a smooth doliform depression facing the object; the fourth surface of the second lens is an arc convex facing the image; said fifth surface of the third lens is an arc convex to the object; and the sixth surface of the third lens is a smooth doliform depression facing the image.

The optical lens component provided in the present invention fully employs aspheric design. The surface shape of each lens of the lens component is using arc structure. The entire length of the lens is shortened. All aberrations may be corrected well and thus better optical properties, more convenient processing and lower cost may be obtained.

BRIEF DESCRIPTION OF THE DRAWINGS

The foregoing and other features and advantages of the invention will be better understood from the following detailed description of preferred embodiments of this invention when taken conjunction with the accompanying drawings in which.

DETAILED DESCRIPTION OF THE PREFERRED

The aforementioned features and advantages of the invention as well as additional features and advantages thereof will be more clearly understood hereafter as a result of a detailed description of the following embodiments when taken conjunction with the drawings.

The First Embodiment

Figure 1:
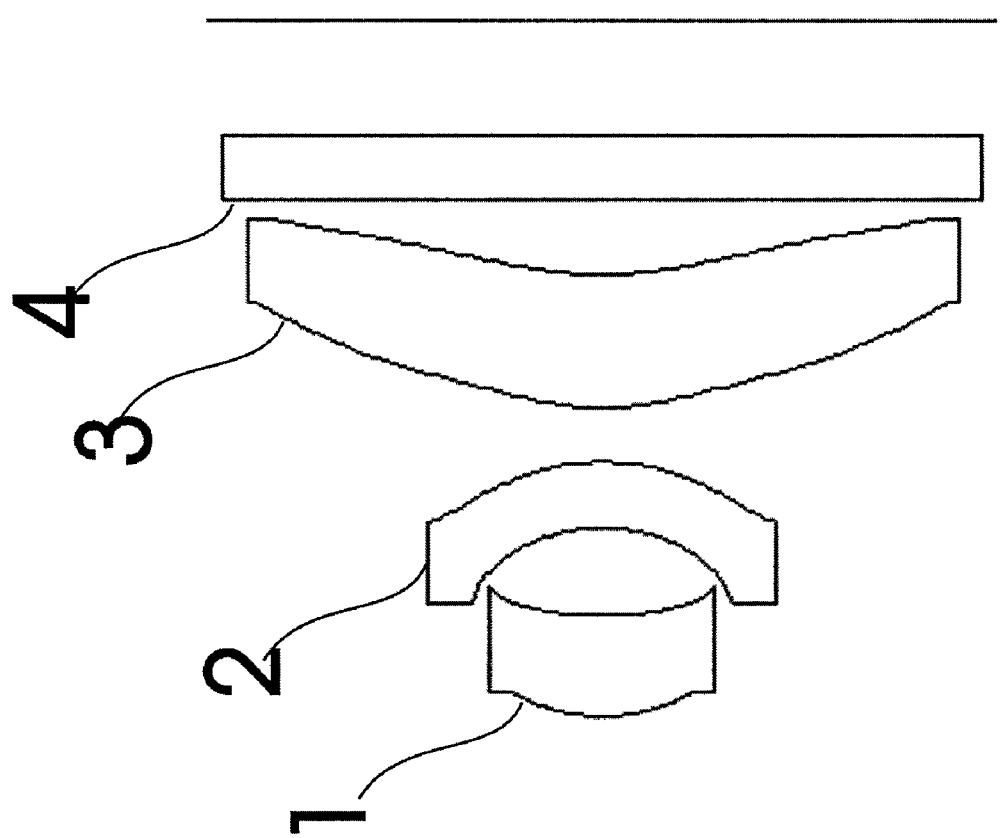
FIG. 1 is a structural diagram of an optical component of the first embodiment of an optical lens provided in the present invention.

As shown in FIG. 1, an optical lens component provided in the present invention comprises a fixed diaphragm, a lens group and a filter 4. Said lens group having an optical axis comprises a first lens 1, a second lens 2 and a third lens 3 that all are made of plastic and are coaxial along the optical axis and arranged successively along the optical axis from an object to an image. Said fixed diaphragm is located in the front of the first lens and the distance between the edges of the fixed diaphragm and the first lens is greater than or equal to zero. Said filter is located behind the third lens such that its front surface faces the object and its back surface faces the image; the first lens has a first surface facing the object and a second surface facing the image; the second lens has a third surface facing the object and a fourth surface facing the image; the third lens has a fifth surface facing the object and a sixth surface facing the image. The above six surfaces of the lens group are all aspheric surfaces, said first surface is an arc convex facing the object; the second surface is a smooth doliform depression facing the image; said third surface is a smooth doliform depression facing the object; the fourth surface is an arc convex facing the image; said fifth surface is an arc convex facing the object; the sixth surface is a smooth doliform depression facing the image. The above mentioned fixed diaphragm can be configured on the front of the first lens or configured directly on the first surface of the first lens. In some embodiment, the fixed diaphragm (not shown in FIG. 1) is configured on the first surface of the first lens.

The above mentioned optical lens component fully employs aspheric design. The surface shape of each lens of the lens component is using arc structure, so the entire length of the lens may be shortened. All aberrations may be corrected well and better optical properties, more convenient processing and lower cost may be obtained.

Furthermore, said optical lens component should meet the following requirements:

1.15<$L/f$<1.3;

0.8<$f1/f$<1.2;

$f2$<0 and 1.15<$|f2/f|$<2.2;

1.1<$f3/f$<2.2;

wherein f is the effective focal length of the entire optical lens component; L is the total length of the optical lens component; f1 is the effective focal length of the first lens; f2 is the effective focal length of the second lens; f3 is the effective focal length of the third lens. The total length of the lens component and the effective focal lengths among all lenses are limited, so the total length of the lens is more shortened, and thus all aberrations are corrected well, and better optical properties are obtained.

Wherein, the first lens is made of ZEONEX, and the refractive index n1 is 1.53 and the chromatic dispersion v1 is 56; the second lens is made of PC, and the refractive index n2 is 1.585 and the chromatic dispersion v2 is 29.5; the third lens is made of ZEONEX, and the refractive index n1 is 1.53 and the chromatic dispersion v1 is 56.

wherein, Z is the axial value vertical to the optical axis, taking the intersection point of each aspheric surface and the optical axis as the starting point; k is the quadric surface coefficient; c is the curvature at the center of the mirror and c=1/R, wherein R is the curvature radius at the center of the mirror; r is the height at the center of the mirror; a1, a2, a3, a4, a5 and a6 are all aspheric coefficients.

The Second Embodiment

Based on the first embodiment, the second embodiment provided in the present invention further proposes relevant parameters as follows:

Lens parameters:

| Type | Curvature Radius (R) | Quadric Surface Coefficient (k) | Thickness (dmm) |
|---|---|---|---|
| The First Surface | 0.725842533 | 0.219875 | 0.50 |
| The Second Surface | 1.443133123 | 8.019236 | 0.30 |
| The Third Surface | −1.54341365 | −0.013897 | 0.4 |
| The Fourth Surface | −1.84331333 | −3.237001 | 0.10 |
| The Fifth Surface | 0.453135433 | −4.072578 | 0.55 |
| The Sixth Surface | 1.053436434 | −1.999519 | 0.36 |
| Front Surface of the Filter | | | 0.3 |
| Back Surface of the Filter | | | 0.5222756 |
| Image Surface | | | 0 |

Aspheric coefficients:

| Type | a2 | a4 | a6 | a8 | a10 | a12 |
|---|---|---|---|---|---|---|
| The First Surface | 0 | −0.545313533 | 1.044353543 | −5.86456842 | 22.4353121 | 0 |
| The Second Surface | 0 | −0.542135353 | −0.24535212 | −1.24656545 | 0 | 0 |
| The Third Surface | −0.05435433 | −0.255468633 | −2.212545325 | 5.04656331 | 23.43531365 | 0 |
| The Fourth Surface | 0.243564133 | −1.456521357 | 1.2124353533 | −0.95435212 | 0.245432112 | 0 |
| The Fifth Surface | −0.451312313 | −0.354512222 | 0.4535215345 | −0.21563532 | 0.002435353 | 0 |
| The Sixth Surface | −1.243646533 | −0.854253315 | 0.1453535353 | 0.024353635 | −0.02343543 | 0 |

Said filter 4 is a glass plate, and the front and back surfaces of the glass plate are coated with an infrared cut coating (IR-cut Coating). Such coating is used to filter the infrared ray coming from the reflection light of the object photographed and to improve the imaging quality.

The surface shape of said aspheric surface meets the following equation:

$$z = \frac{cr^2}{1 + \sqrt{1 - (1+k)c^2 r^2}} + a_1 r^2 + a_2 r^4 + a_3 r^6 + a_4 r^8 + a_5 r^{10} + a_6 r^{12}$$

The thickness d in the table is a distance from the current surface to the next surface; the total length of the lens L is 3.2 mm; the effective focal length f is 2.657 mm; the effective focal length of the first lens f1 is 2.6075 mm; the effective focal length of the second lens f2 is 5.7211 mm; the effective focal length of the third lens f3 is 5.3474 mm.

Figure 2:
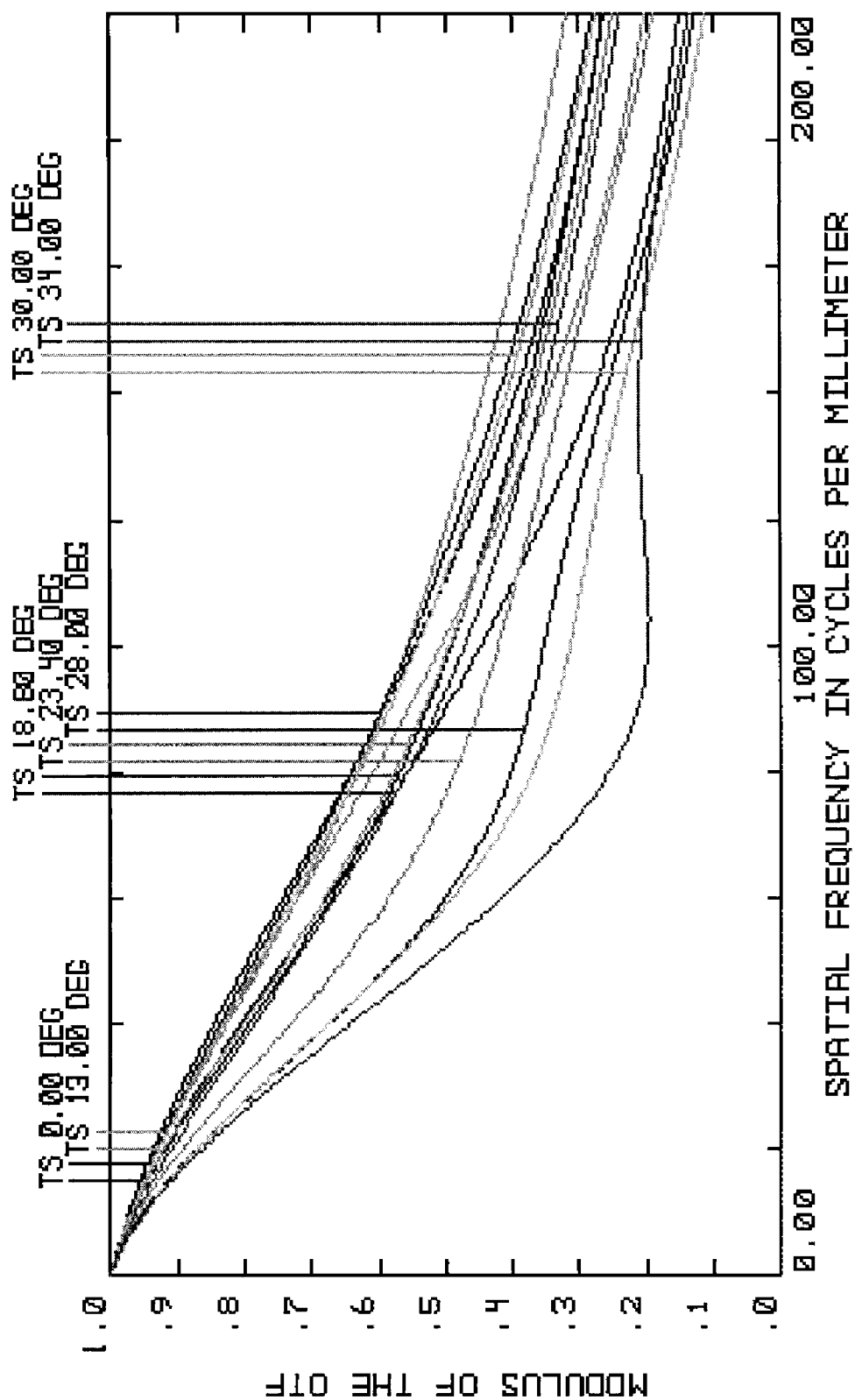
FIG. 2 is a modulation transfer function (MTF) graph of an optical lens of the second embodiment provided in the present invention.

FIG. 2 is a modulation transfer function (MTF) graph of the optical lens of the second embodiment provided in the present invention. In the diagram, the transverse axis denotes spatial frequency (lp/mm); the longitudinal axis denotes numerical value of the modulation transfer function (MTF). Said MTF numerical value is used to evaluate imaging quality of the lens. The value range is 0-1. The higher and straighter the curve, the better the imaging quality of the lens and the stronger capacity to restore to real image. As shown in FIG. 2, the MTF curve of the meridian direction T is very close to the one of the sagittal direction in each view field. This indicates that the imaging performance of the lens component is consistent in the meridian and the sagittal directions in each view field, which ensures the lens component to image clearly in the entire imaging surface, and the phenomenon of clear center imaging and blurred margin imaging will not occur.

Figure 3:
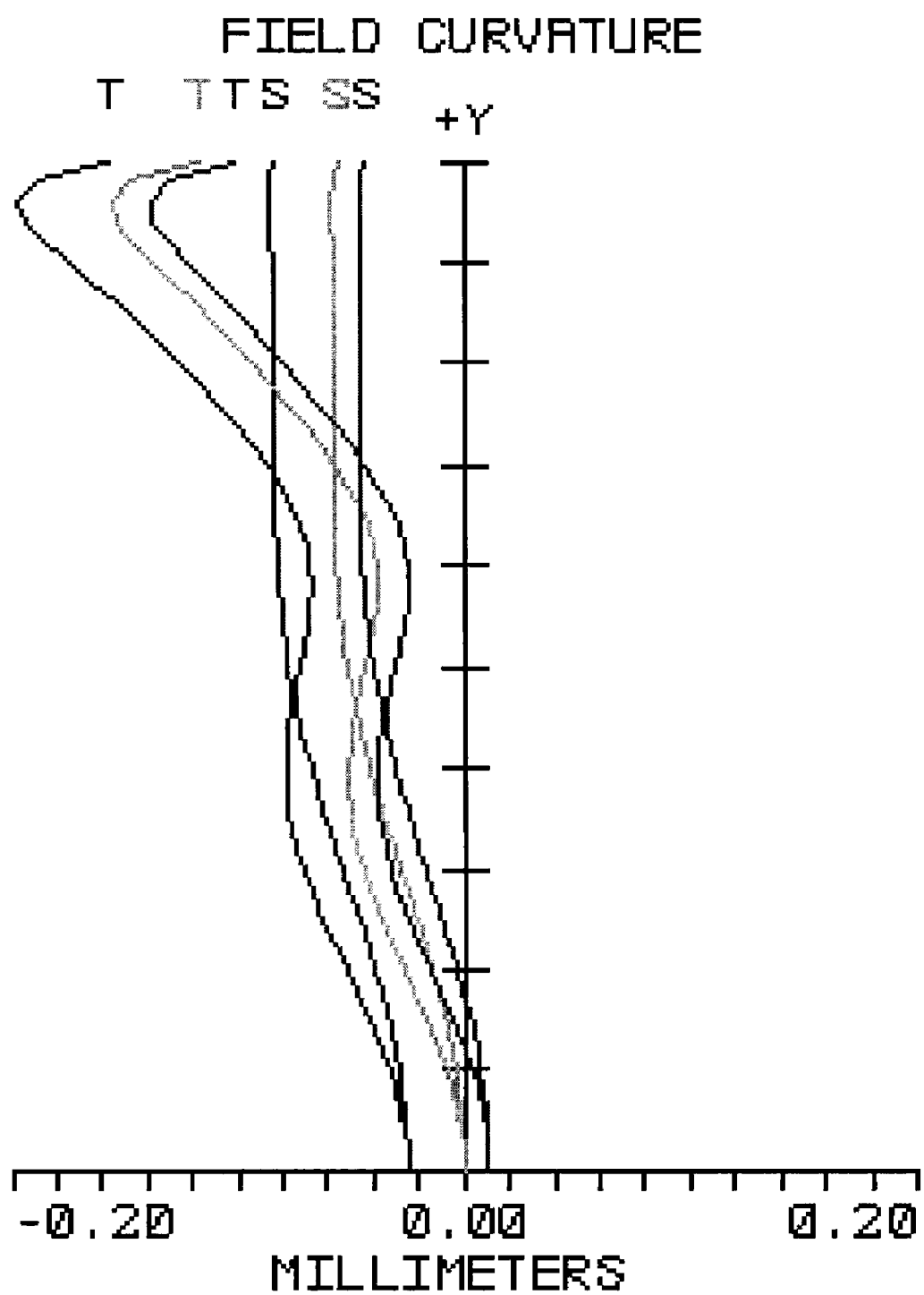
FIG. 3 is a field curvature schematic diagram of an optical lens of the second embodiment.
Figure 4:
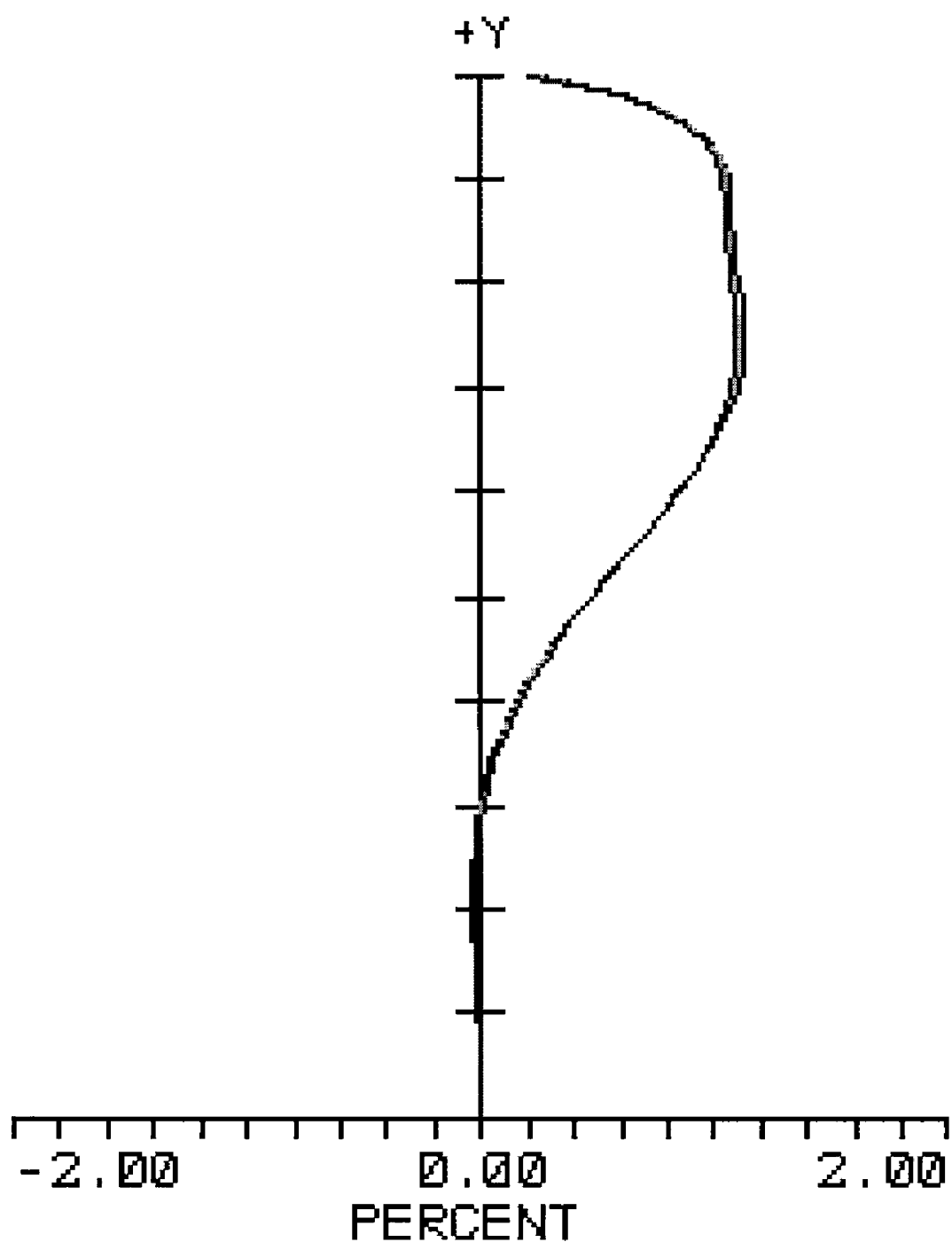
FIG. 4 is a distortion schematic diagram of an optical lens of the second embodiment.

FIG. 3 and FIG. 4 are the field curvature and distortion schematic diagrams of the optical lens of the second embodiment. As shown in FIGS. 3 and 4, the field curvature of the lens component is less than 0.20 mm, and the distortion is less than 2%. Such lens component can coordinate with the receiving requirement of the image sensors like CMOS and charge coupled device (CCD) in the current market.

Therefore, this embodiment of the present invention not only ensures the appropriate back focal length based on the shortened total length of the lens, but also corrects well for all aberrations, especially non-point aberration and distortion aberration. Therefore, an ideal optical property can be achieved.

The Third Embodiment

Based on the first embodiment, the third embodiment provided in the present invention further proposes relevant parameters as follows:

Lens parameters:

| Type | Curvature Radius (R) | Quadric Surface Coefficient (k) | Thickness (dmm) |
|---|---|---|---|
| The First Surface | 0.657258324 | 3.5894565 | 0.49 |
| The Second Surface | 1.254786389 | 12.013356 | 0.58 |
| The Third Surface | −1.52478968 | 5.01456912 | 0.32 |
| The Fourth Surface | −1.75423656 | −4.5748566 | 0.12 |
| The Fifth Surface | 0.578965228 | −3.0145355 | 0.7 |
| The Sixth Surface | 0.755124528 | −0.997392 | 0.35 |
| Front Surface of the Filter | | | 0.3 |
| Back Surface of the Filter | | | 0.721399 |
| Image Surface | | | 0 |

Aspheric coefficients:

| Type | a2 | a4 | a6 | a8 | a10 | a12 |
|---|---|---|---|---|---|---|
| The First Surface | 0 | −0.25789542 | 1.3009362 | −8.748264 | 30.681718 | 0 |
| The Second Surface | 0 | −0.514896235 | −0.614896235 | −1.09836311 | 0 | 0 |
| The Third Surface | −0.05418438 | −0.50172818 | −2.9006379 | 5.7179354 | 36.342181 | 0 |
| The Fourth Surface | 0.1214719008 | −1.73149655 | 1.9819229 | −1.03512336 | 0.78944427 | 0 |
| The Fifth Surface | −0.154660372 | −0.253777899 | 0.349527749 | −0.286400993 | 0.0058722231 | 0 |
| The Sixth Surface | −1.50641184 | −0.82481894 | 0.075128767 | 0.0176367374 | −0.01456542329 | 0 |

The thickness d in the table is a distance from the current surface to the next surface; the total length of the lens L is 3.5814 mm; the effective focal length f is 2.86721 mm; the effective focal length of the first lens f1 is 2.9377 mm; the effective focal length of the second lens f2 is 3.5054 mm; the effective focal length of the third lens f3 is 3.267 mm.

Figure 5:
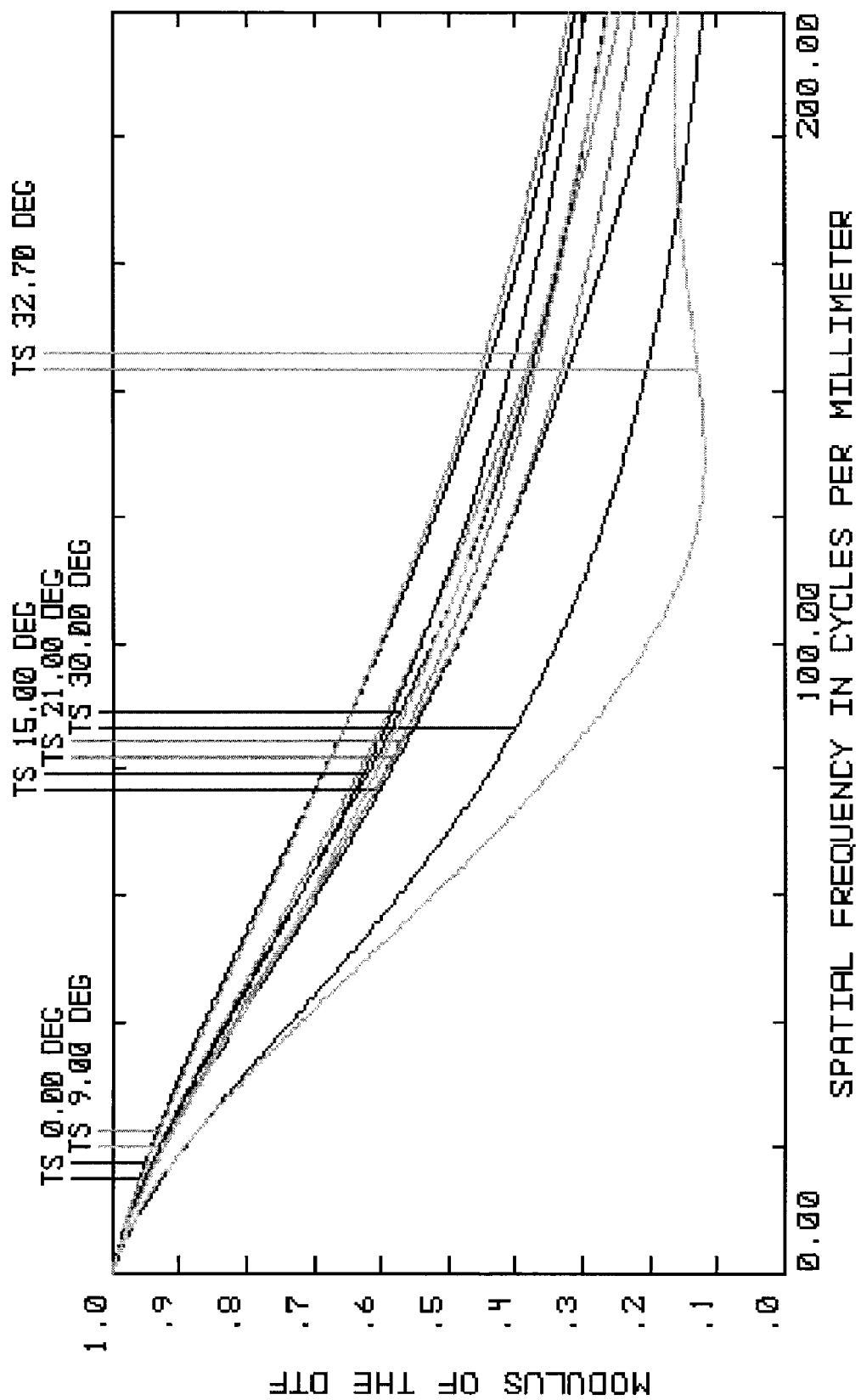
FIG. 5 is a modulation transfer function (MTF) graph of an optical lens of the third embodiment provided in the present invention.

FIG. 5 is a modulation transfer function (MTF) graph of the optical lens of the third embodiment provided in the present invention. In the graph, the transverse axis denotes spatial frequency (lp/mm); the longitudinal axis denotes numerical value of the modulation transfer function (MTF). Said MTF numerical value is used to evaluate the imaging quality of the lens. The value range is 0-1. The higher and straighter the curve, the better the imaging quality of the lens and the stronger capacity to restore to real image. As shown in FIG. 2, the MTF curve of the meridian direction T is very close to the one of the sagittal direction in each view field. This shows that the imaging performance of the lens component is consistent in the meridian and the sagittal directions in each view field, which ensures the lens component to image clearly in the entire imaging surface, and the phenomenon of center clear imaging and blurred margin imaging will not occur.

Figure 6:
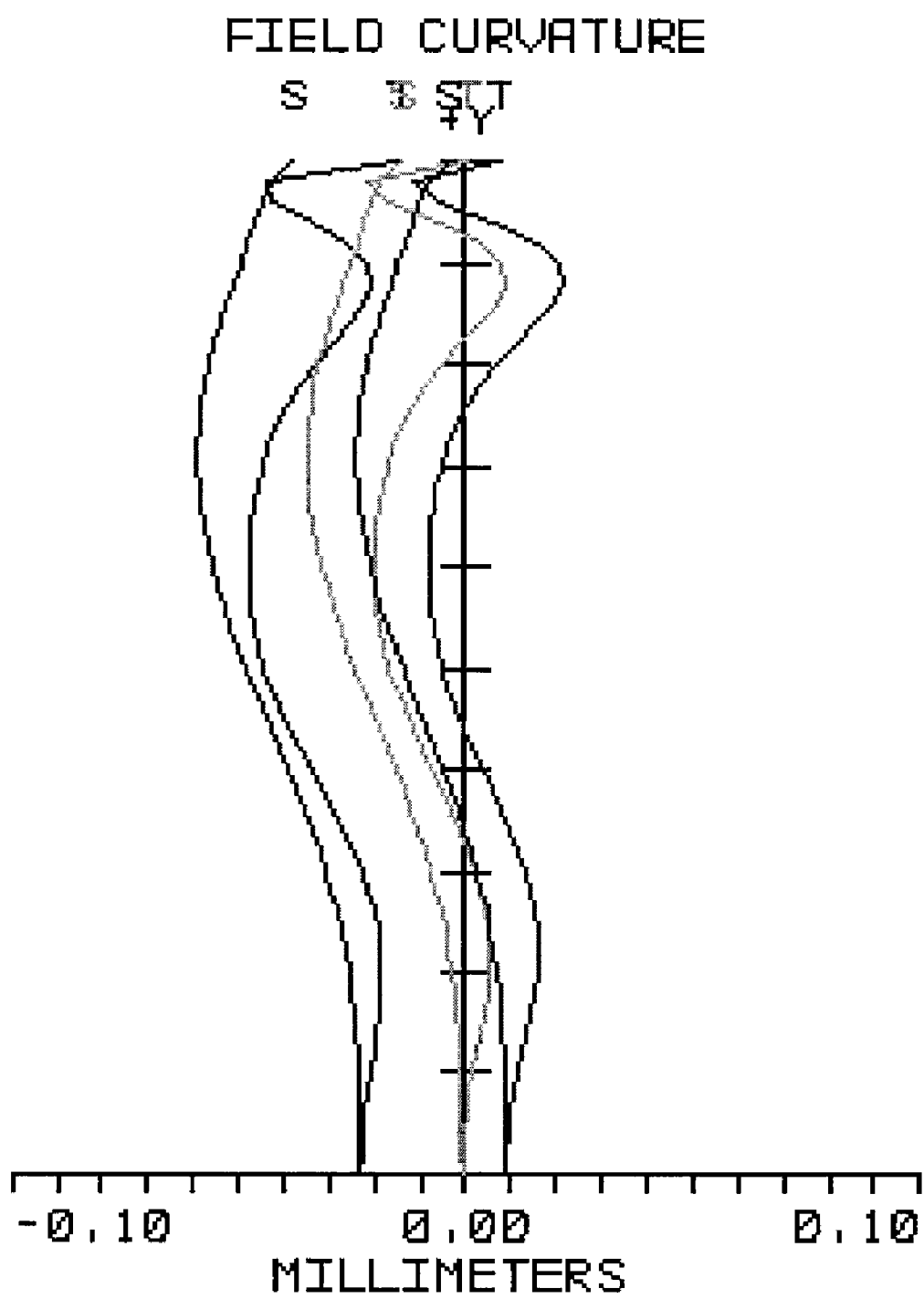
FIG. 6 is a field curvature schematic diagram of an optical lens of the third embodiment.
Figure 7:
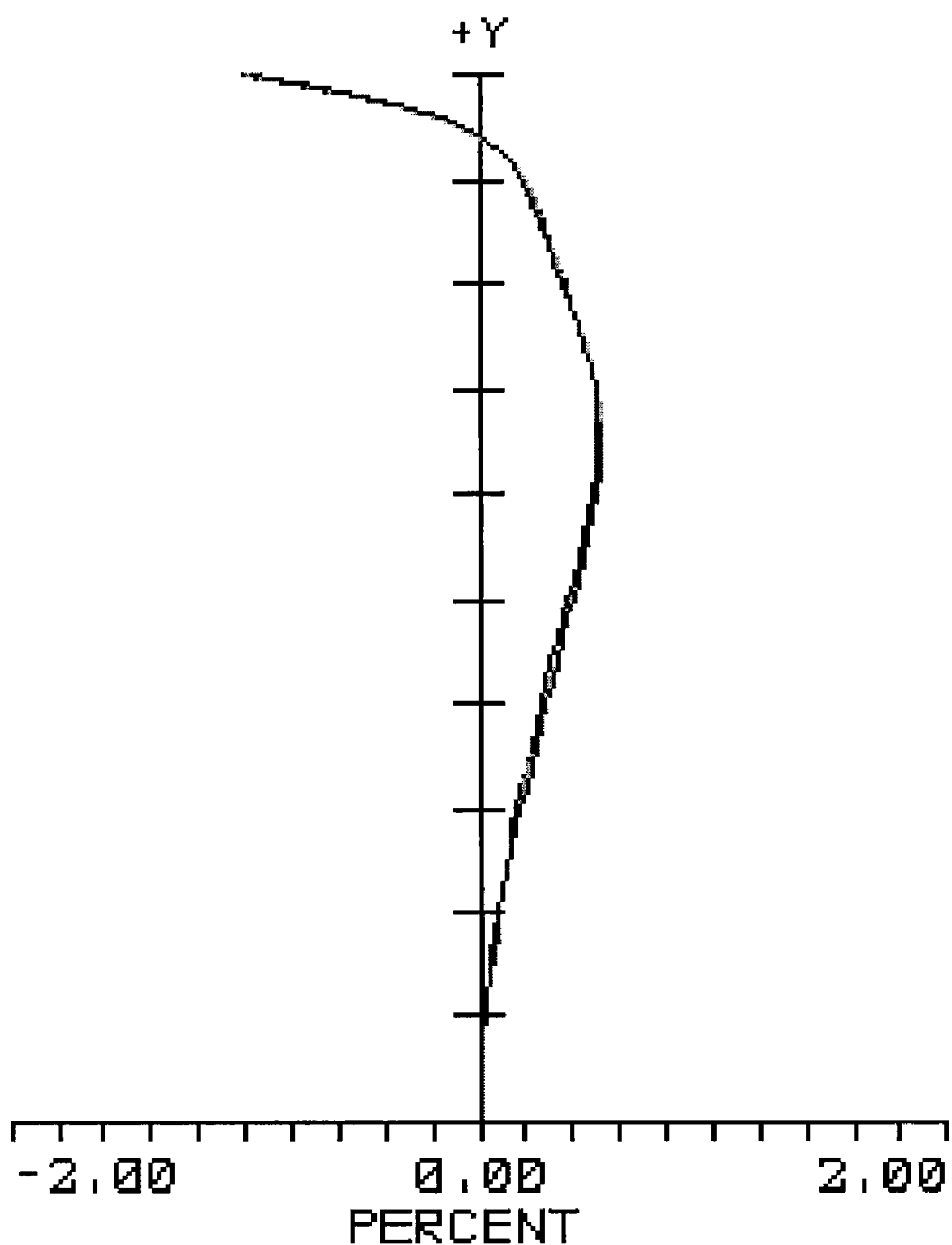
FIG. 7 is a distortion schematic diagram of an optical lens of the third embodiment.

FIG. 6 and FIG. 7 are the field curvature and distortion schematic diagrams of the optical lens of the third embodiment. As shown in FIGS. 6 and 7, the field curvature of the lens component is less than 0.10 mm, and the distortion is less than 2%. Such lens component can coordinate with the receiving requirement of the image sensors like CMOS and charge coupled device (CCD) in the current market.

Therefore, this embodiment of the present invention not only ensures the appropriate back focal length based on the shortened total length of the lens, but also corrects well for all aberrations, especially non-point aberration and distortion aberration. Therefore, an ideal optical property can be achieved.

The Fourth Embodiment

Based on the first embodiment, the fourth embodiment provided in the present invention further proposes relevant parameters as follows:

Lens parameters:

| Type | Curvature Radius (R) | Quadric Surface Coefficient (k) | Thickness (dmm) |
|---|---|---|---|
| The First Aspheric Surface | 0.657258324 | 0.204142 | 0.62 |
| The Second Aspheric Surface | 1.254786389 | −1.654257 | 0.71 |
| The Third Aspheric Surface | −1.52478968 | −130.0451332 | 0.32 |
| The Fourth Aspheric Surface | −1.75423656 | −6.512463 | 0.18 |
| The Fifth Aspheric Surface | 0.578965228 | −13.210543 | 0.69 |
| The Sixth Aspheric Surface | 0.755124528 | −3.246332 | 0.366 |
| Front Surface of the Filter | | | 0.3 |
| Back Surface of the Filter | | | 0.949275 |
| Image Surface | | | 0 |

Aspheric coefficients:

| Type | a2 | a4 | a6 | a8 | a10 | a12 |
|---|---|---|---|---|---|---|
| The First Surface | 0 | −0.35489646 | 1.425786235 | −7.2457863 | 25.453579 | 0 |
| The Second Surface | 0 | −0.55245353 | −0.54278934 | −0.98756312 | 0 | 0 |
| The Third Surface | −0.067854212 | −0.45789542 | −2.54861345 | 6.156548654 | 34.214563 | 0 |
| The Fourth Surface | 0.1145786422 | −1.54789631 | 2.015456123 | −1.01245334 | 0.8147856712 | 0 |
| The Fifth Surface | −0.134561233 | −0.30214521 | 0.401252323 | −0.25789456 | 0.0012457312 | 0 |
| The Sixth Surface | −1.452145321 | −0.65471563 | 0.104312456 | 0.025789542 | −0.015423456 | 0 |

The thickness d in the table is a distance from the current surface to the next surface; the total length of the lens L is 4.08527 mm; the effective focal length f is 3.52466 mm; the effective focal length of the first lens f1 is 3.5074 mm; the effective focal length of the second lens f2 is 4.5468 mm; the effective focal length of the third lens f3 is 4.6202 mm.

Figure 8:
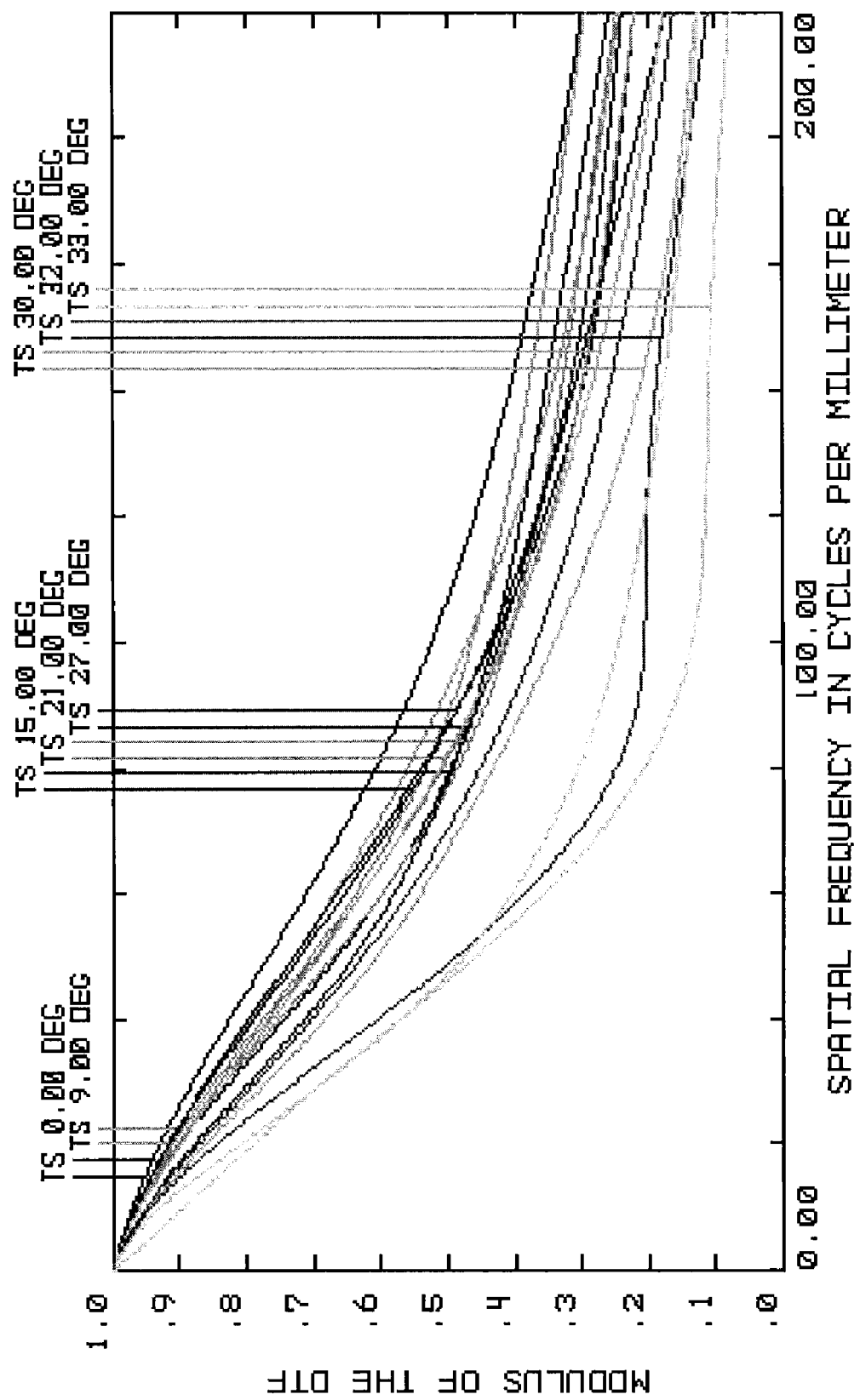
FIG. 8 is a modulation transfer function (MTF) graph of an optical lens of the fourth embodiment provided in the present invention.

FIG. 8 is a modulation transfer function (MTF) graph of the optical lens of the fourth embodiment provided in the present invention. In the graph, the transverse axis denotes spatial frequency (lp/mm); the longitudinal axis denotes numerical value of the modulation transfer function (MTF). Said MTF numerical value is used to evaluate imaging quality of the lens. The value range is 0-1. The higher and straighter the curve, the better the imaging quality of the lens and the stronger capacity to restore to real image. As shown in FIG. 2, the MTF curve of the meridian direction T is very close to the one of the sagittal direction in each view field. This indicates that the imaging performances of the lens component is consistent in the meridian and the sagittal directions in each view field, which ensures the lens component to image clearly in the entire imaging surface, and the phenomenon of center clear imaging and blurred margin imaging will not occur.

Figure 9:
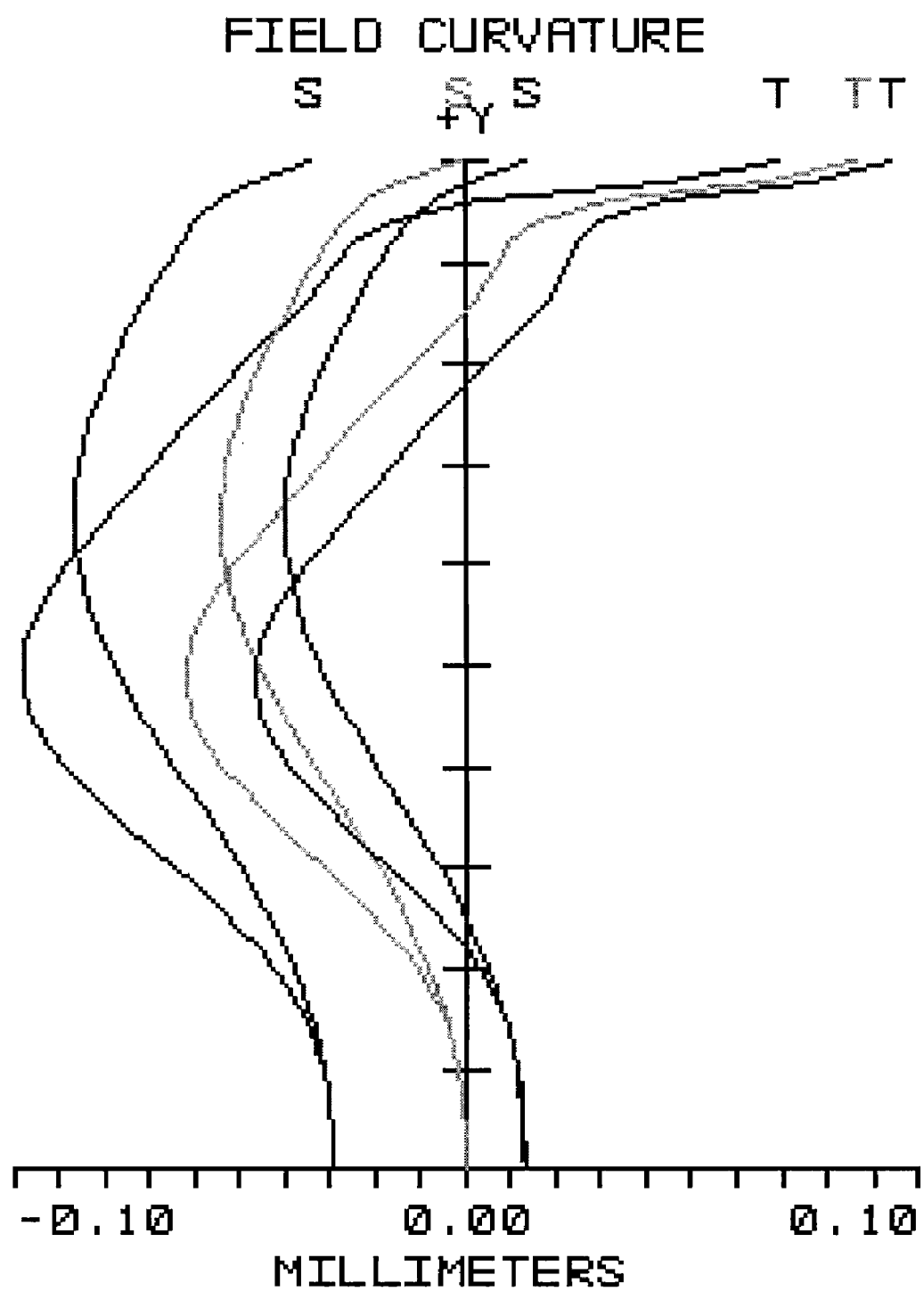
FIG. 9 is a field curvature schematic diagram of an optical lens of the fourth embodiment.
Figure 10:
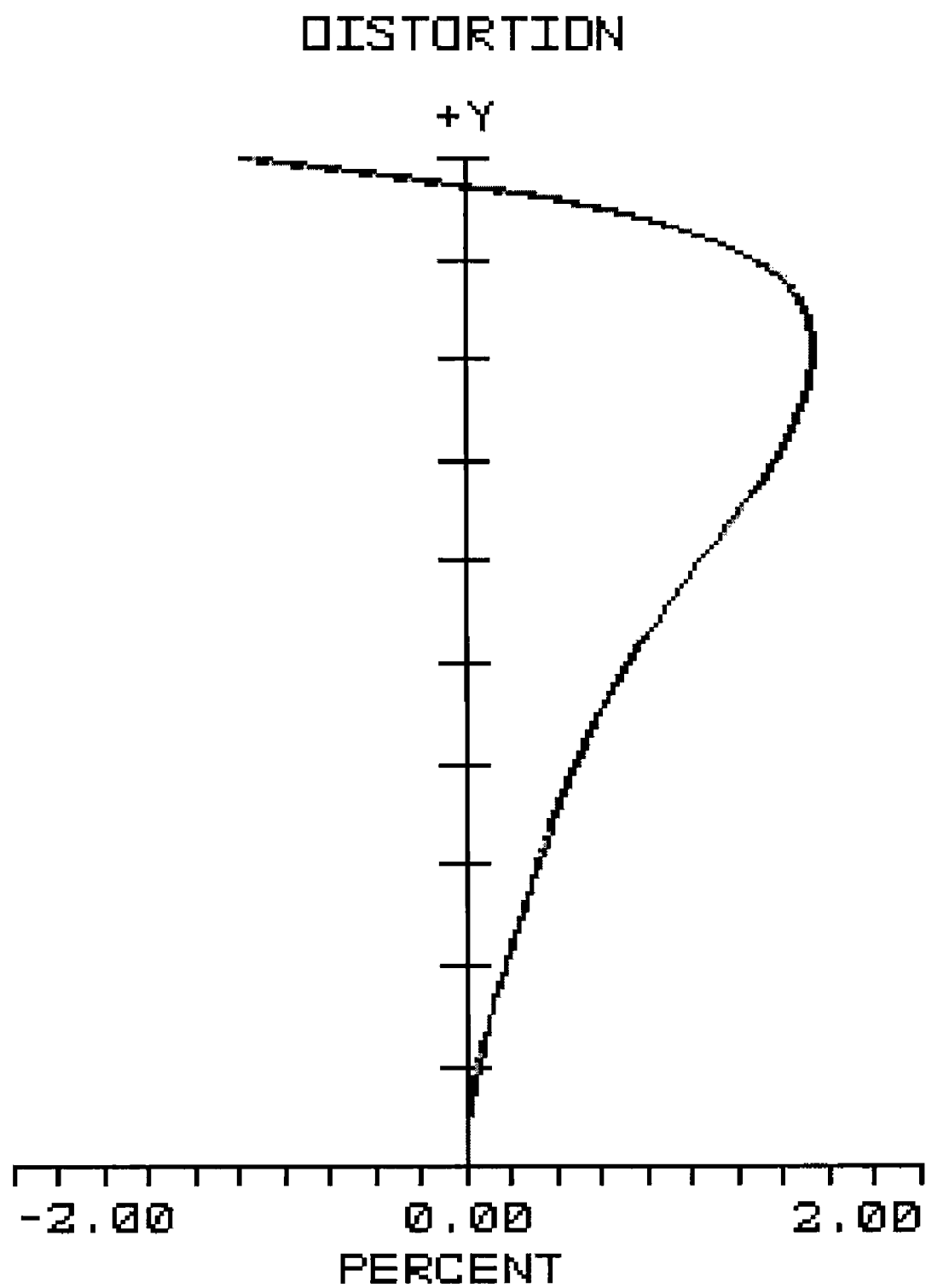
FIG. 10 is a distortion schematic diagram of an optical lens of the fourth embodiment.

FIG. 9 and FIG. 10 are the field curvature and distortion schematic diagrams of the optical lens of the fourth embodiment. As shown in FIGS. 9 and 10, the field curvature of the lens component is less than 0.10 mm, and the distortion is less than 2%. Such lens component can coordinate with the receiving requirement of the image sensors like CMOS and charge coupled device (CCD) in the current market.

Therefore, this embodiment of the present invention not only ensures the appropriate back focal length based on the shortened total length of the lens, but also corrects well for all aberrations, especially non-point aberration and distortion aberration. Therefore, an ideal optical property can be achieved.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An optical lens component, comprising:
   a fixed diaphragm;
   a lens group having an optical axis and including a first lens, a second lens, and a third lens; and
   a filter;

wherein:
   the three lens are coaxial along the optical axis and arranged successively along the optical axis from an object to an image;
   the fixed diaphragm is located in front of the first lens, and the distance between the edges of said fixed diaphragm and the first lens is greater than or equal to zero;
   the filter is located behind the third lens such that its front surface faces the object and its back surface faces the image;
   the first lens has a first surface facing the object and a second surface facing the image;
   the second lens has a third surface facing the object and a fourth surface facing the image;
   the third lens has a fifth surface facing the object and a sixth surface facing the image;
   wherein the six surfaces of the lens group are all aspheric surfaces, and
   the first surface of the first lens is an arc convex facing the object;
   the second surface of the first lens is a smooth doliform depression facing the image;

the third surface of the second lens is a smooth doliform depression facing the object;

the fourth surface of the second lens is an arc convex facing the image;

the fifth surface of the third lens is an arc convex facing the object; and the sixth surface of the third lens is a smooth doliform depression facing the image; and wherein the optical lens component is configured to meet the following requirements:

$1.15 < L/f < 1.3;$ $0.8 < f1/f < 1.2;$ $f2 < 0$ and $1.15 < |f2/f| < 2.2;$ and $1.1 < f3/f < 2.2;$ wherein:
f is the effective focal length of the optical lens component;
L is the total length of the optical lens component;
f1 is the effective focal length of the first lens;
f2 is the effective focal length of the second lens; and
f3 is the effective focal length of the third lens.

2. The optical lens component according to claim 1, wherein the first lens is made of ZEONEX.

3. The optical lens component according to claim 2, wherein the refractive index n1 of the first lens is about 1.53.

4. The optical lens component according to claim 2, wherein the chromatic dispersion v1 of the first lens is about 56.

5. The optical lens component according to claim 1, wherein the second lens is made of PC.

6. The optical lens component according to claim 5, wherein the refractive index n2 of the second lens is about 1.585.

7. The optical lens component according to claim 5, wherein the chromatic dispersion v2 of the second lens is about 29.5.

8. The optical lens component according to claim 1, wherein the third lens is made of ZEONEX.

9. The optical lens component according to claim 8, wherein the refractive index n1 of the third lens is about 1.53.

10. The optical lens component according to claim 8, wherein the chromatic dispersion v1 of the third lens is about 56.

11. The optical lens component according to claim 1, wherein the filter is made of a glass plate.

12. The optical lens component according to claim 11, wherein at least one surface of the glass plate is coated with an infrared cut coating (IR-cut coating).

13. The optical lens component according to claim 1, wherein the surface shape of the aspheric surfaces are configured to meet the following equation:

$$z = \frac{cr^2}{1 + \sqrt{1 - (1+k)c^2r^2}} + a_1 r^2 + a_2 r^4 + a_3 r^6 + a_4 r^8 + a_5 r^{10} + a_6 r^{12}$$

wherein:
Z is an axial value vertical to the optical axis using the intersection point of each aspheric surface and the optical axis as the starting point;

k is an quadric surface coefficient;

c is a curvature at the center of the lens group and $c=1/R$, wherein R is the curvature radius at the center of the lens group;

r is the height at the center of the lens group; and a1, a2, a3, a4, a5 and a6 are respective aspheric coefficients of the six aspheric surfaces.

14. The optical lens component according to claim 13, wherein the optical lens component is configured to meet the following parameters:

Lens parameters:

| Type | Curvature Radius (R) | Quadric Surface Coefficient (k) | Thickness (dmm) |
| --- | --- | --- | --- |
| The First Surface | 0.725842533 | 0.219875 | 0.50 |
| The Second Surface | 1.443133123 | 8.019236 | 0.30 |
| The Third Surface | −1.54341365 | −0.013897 | 0.4 |
| The Fourth Surface | −1.84331333 | −3.237001 | 0.10 |
| The Fifth Surface | 0.453135433 | −4.072578 | 0.55 |
| The Sixth Surface | 1.053436434 | −1.999519 | 0.36 |
| Front Surface of the Filter | | | 0.3 |
| Back Surface of the Filter | | | 0.5222756 |
| Image Surface | | | 0 |

Aspheric coefficients:

| Type | a2 | a4 | a6 | a8 | a10 | a12 |
| --- | --- | --- | --- | --- | --- | --- |
| The First Surface | 0 | −0.545313533 | 1.044353543 | −5.86456842 | 22.4353121 | 0 |
| The Second Surface | 0 | −0.542135353 | −0.24535212 | −1.24656545 | 0 | 0 |
| The Third Surface | −0.05435433 | −0.255468633 | −2.212545325 | 5.046565331 | 23.43531365 | 0 |
| The Fourth Surface | 0.243564133 | −1.456521357 | 1.2124353533 | −0.95435212 | 0.245432112 | 0 |
| The Fifth Surface | −0.451312313 | −0.354512222 | 0.4535215345 | −0.21563532 | 0.002435353 | 0 |
| The Sixth Surface | −1.243646533 | −0.854253315 | 0.1453535353 | 0.024353635 | −0.02343543 | 0. |

15. The optical lens component according to claim 13, wherein the optical lens component is configured to meet the following parameters:

Lens parameters:

| Type | Curvature Radius (R) | Quadric Surface Coefficient (k) | Thickness (dmm) |
|---|---|---|---|
| The First Surface | 0.657258324 | 3.5894565 | 0.49 |
| The Second Surface | 1.254786389 | 12.013356 | 0.58 |
| The Third Surface | −1.52478968 | 5.01456912 | 0.32 |
| The Fourth Surface | −1.75423656 | −4.5748566 | 0.12 |
| The Fifth Surface | 0.578965228 | −3.0145355 | 0.7 |
| The Sixth Surface | 0.755124528 | −0.997392 | 0.35 |
| Front Surface of the Filter | | | 0.3 |
| Back Surface of the Filter | | | 0.721399 |
| Image Surface | | | 0 |

Aspheric coefficients:

| Type | a2 | a4 | a6 | a8 | a10 | a12 |
|---|---|---|---|---|---|---|
| The First Surface | 0 | −0.25789542 | 1.3009362 | −8.748264 | 30.681718 | 0 |
| The Second Surface | 0 | −0.514896235 | −0.614896235 | −1.09836311 | 0 | 0 |
| The Third Surface | −0.05418438 | −0.50172818 | −2.9006379 | 5.7179354 | 36.342181 | 0 |
| The Fourth Surface | 0.1214719008 | −1.73149655 | 1.9819229 | −1.03512336 | 0.78944427 | 0 |
| The Fifth Surface | −0.154660372 | −0.253777899 | 0.349527749 | −0.286400993 | 0.0058722231 | 0 |
| The Sixth Surface | −1.50641184 | −0.82481894 | 0.075128767 | 0.0176367374 | −0.01456542329 | 0. |

16. The optical lens component according to claim 13, wherein the optical lens component is configured to meet the following parameters:

Lens parameters:

| Type | Curvature Radius (R) | Quadric Surface Coefficient (k) | Thickness (dmm) |
|---|---|---|---|
| The First Aspheric Surface | 0.657258324 | 0.204142 | 0.62 |
| The Second Aspheric Surface | 1.254786389 | −1.654257 | 0.71 |
| The Third Aspheric Surface | −1.52478968 | −130.0451332 | 0.32 |
| The Fourth Aspheric Surface | −1.75423656 | −6.512463 | 0.18 |
| The Fifth Aspheric Surface | 0.578965228 | −13.210543 | 0.69 |
| The Sixth Aspheric Surface | 0.755124528 | −3.246332 | 0.366 |
| Front Surface of the Filter | | | 0.3 |
| Back Surface of the Filter | | | 0.949275 |
| Image Surface | | | 0 |

Aspheric coefficients:

| Type | a2 | a4 | a6 | a8 | a10 | a12 |
|---|---|---|---|---|---|---|
| The First Surface | 0 | −0.35489646 | 1.425786235 | −7.2457863 | 25.453579 | 0 |
| The Second Surface | 0 | −0.55245353 | −0.54278934 | −0.98756312 | 0 | 0 |
| The Third Surface | −0.067854212 | −0.45789542 | −2.54861345 | 6.156548654 | 34.214563 | 0 |
| The Fourth Surface | 0.1145786422 | −1.54789631 | 2.015456123 | −1.01245334 | 0.8147856712 | 0 |
| The Fifth Surface | −0.134561233 | −0.30214521 | 0.401252323 | −0.25789456 | 0.0012457312 | 0 |
| The Sixth Surface | −1.452145321 | −0.65471563 | 0.104312456 | 0.025789542 | −0.015423456 | 0. |

* * * * *